UNITED STATES PATENT OFFICE.

ALEXANDER KUMPFMILLER, OF HOCKLINGSEN, NEAR HEMER, GERMANY.

TANNIN-CONTAINING EXTRACT AND PROCESS OF PRODUCING SAME.

940,394. Specification of Letters Patent. Patented Nov. 16, 1909.

No Drawing. Application filed September 24, 1908. Serial No. 454,615. (Specimens.)

*To all whom it may concern:*

Be it known that I, ALEXANDER KUMPF-MILLER, a subject of the King of Prussia, and resident of Hocklingsen, near Hemer, in the Province of Westphalia, Germany, have invented certain new and useful Improvements in Tannin-Containing Extracts and Process of Producing Same, of which the following is a specification.

It is already known that most tannin-containing extracts are only with difficulty soluble in water. It is also known that the solubility of these extracts may be considerably increased by adding a suitable percentage of a bisulfite. By this addition however, the tanning qualities of the extract are affected. I have found that sulfite cellulose solutions which have been freed from sulfurous acid and calcium compounds have the same effect as the usual bisulfites above referred to as far as an increase of solubility is concerned, but do not produce any deleterious effect on the tanning extract. It is preferable to evaporate, somewhat, the solution of purified sulfite cellulose for the purpose of concentrating the same.

In carrying the invention into effect the sulfite cellulose may be prepared as follows: The cellulose waste lye taken from the usual boiling apparatus is first slightly heated and then poured into a chamber in which a vacuum is created. In this way sulfurous acid is rapidly eliminated, the liquid concentrated and calcium sulfite precipitated. This elimination of the sulfurous acid and the concentration of the solution is preferably carried out while the same is being violently agitated within the evacuated chamber. The remaining solution after this treatment is filtered to separate the calcium sulfite. For the purpose of separating the remaining calcium compounds from the solution, sodium carbonate may be added whereupon the following reaction takes place.

In this way it will be seen, the sodium carbonate converts the calcium bisulfite into insoluble calcium sulfite, the calcium salts of organic acids are converted into sodium salts and carbonate of calcium is formed. The liquid is then filtered for the purpose of separating the sulfite of calcium and the calcium carbonate. Hydrochloric acid is now added to the filtered solution and the following reaction takes place:

$$Na_2SO_3 + 2HCl = SO_2 + H_2O + 2NaCl.$$

Na salt of an organic acid $+ HCl = NaCl +$ organic acid. The organic acid for instance may be tannic acid.

It will be seen from the above that first sodium chlorid and sulfurous acid are obtained and second sodium chlorid and an organic acid. The organic acid and sodium chlorid solution obtained in this way is then concentrated by evaporation to 25°–30° Bé. The vegetable tannin-containing extract, for instance, extract of quebracho of 20° Bé. is then added and the whole mixture concentrated to from 30–35° Bé. The proportion of the mixture of organic acid and sodium chlorid solution and the vegetable tannin-containing extract may be 75% of the first to 25% of the second. If it is desired to effect coloration of the mixture the percentages may be as follows: 70% of the organic acid and sodium chlorid solution 25% of the vegetable tannin-containing extract and 5% of a coloring material for instance an anilin dye known as leather yellow.

By employing cellulose extract according to the present invention as a mixing agent with a vegetable tannin-containing extract I have found that strongly or characteristically colored vegetable extracts, for instance, mangrove extracts, are decolorized. Furthermore the final product obtained, for instance, by mixing cellulose sulfite solution of about 35° Bé. and a quebracho extract of about 25 to 30° Bé., is homogeneous and gives no sediment. This final product is easily soluble in water even if the tannin-containing extract employed is itself soluble with difficulty. The tannin-containing extract alone when allowed to stand forms a sediment. However when mixed with the purified cellulose sulfite solution this does not occur.

It is known that extracts such as quebracho, are exceedingly rich in tanning material, but are not good for the leather for the reason that they do not fill up the leather to give it the necessary "body". By mixing quebracho extract with cellulose extract prepared according to the present invention the necessary filling qualities are imparted to the quebracho. The resulting tanning extract is in fact capable of being used as a substitute for oak tanning extract on ac-

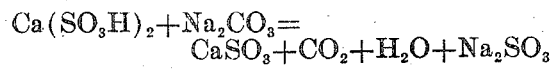

count of the close similarity of its properties with oak tanning extract.

It will be understood that instead of employing quebracho any other vegetable tannin-containing extract may be used such as extract of mangrove, mimosa, chestnut, and so on.

I claim as my invention:

1. The process of producing an easily soluble tan liquor free from sediment from a tannin-containing extract and a purified waste cellulose sulfite solution consisting in eliminating from said waste solution sulfurous acid by subjection to a vacuum and calcium compounds by concentration and filtration, preparing separately the vegetable tannin-containing extract and mixing both together.

2. The process of producing an easily soluble tan liquor free from sediment from a tannin-containing extract and a purified waste cellulose sulfite solution consisting in eliminating from said waste solution sulfurous acid by subjection to a vacuum and calcium compounds by concentration and filtration, preparing separately the quebracho extract and mixing both together whereby the easily soluble tan liquor is obtained free from sediment.

3. The process of producing a tan-liquor easily soluble in water, consisting in preparing a vegetable tannin-containing extract, purifying a waste cellulose sulfite solution by heating same and then pouring it into a chamber from which the air is partially exhausted eliminating thereby sulfurous acid, concentrating the liquor and precipitating insoluble calcium sulfite, separating the latter by filtration, adding carbonate of sodium to the solution transforming thereby the bisulfite of calcium into sulfite of calcium and the calcium salts of organic acids into sodium salts, filtering and adding hydrochloric acid to the filtrate, and mixing the remaining solution with the vegetable tannin-containing extract.

4. The process of producing a tan-liquor easily soluble in water, consisting in preparing a vegetable tannin-containing extract, purifying a waste cellulose sulfite solution by heating same and then pouring it into a chamber from which the air is partially exhausted eliminating thereby sulfurous acid, concentrating the liquor and precipitating insoluble calcium sulfite, separating the latter by filtration, adding carbonate of sodium to the solution transforming thereby the bisulfite of calcium into sulfite of calcium and the calcium salts of organic acids into sodium salts, filtering and adding hydrochloric acid to the filtrate, mixing the remaining solution with the vegetable tannin-containing extract, and adding some coloring material.

In witness whereof I have hereunto set my hand in the presence of two witnesses.

ALEXANDER KUMPFMILLER.

Witnesses:
WOLDEMAR HAUPT,
HENRY HASPER.